Oct. 11, 1960     C. W. BERTHIEZ     2,955,515
MACHINE TOOLS
Filed Sept. 6, 1955

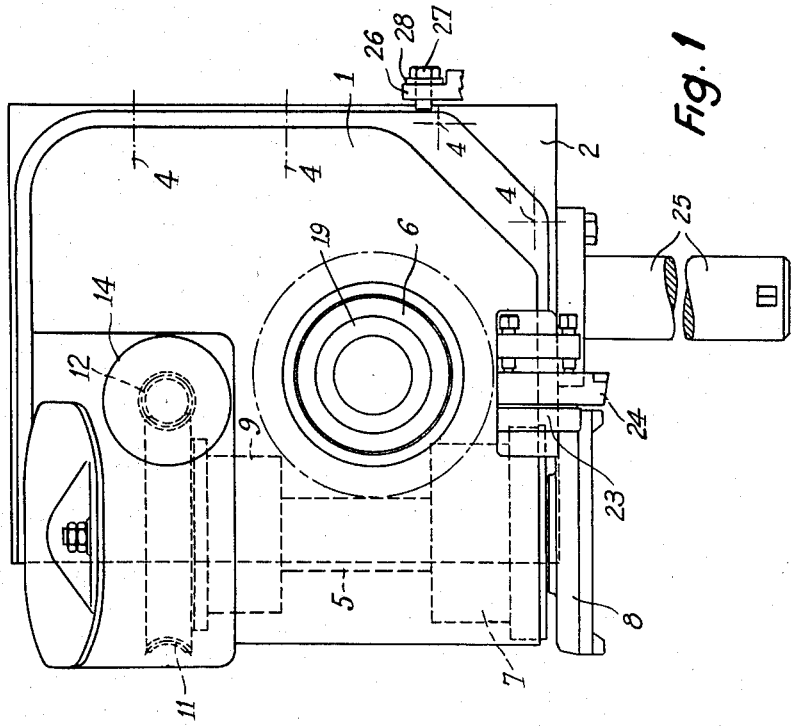

United States Patent Office 2,955,515
Patented Oct. 11, 1960

2,955,515

MACHINE TOOLS

Charles William Berthiez, Paris, France, assignor to Innocenti Societa Generale per l'Industria Metallurgica e Meccanica, Milan, Italy Filed Sept. 6, 1955, Ser. No. 532,655

Claims priority, application France Sept. 6, 1954

6 Claims. (Cl. 90—16)

This invention relates to machine tools of the general class comprising horizontal boring machines and milling and boring machines. A broad object of the invention is to provide improved means in connection with such machines whereby the machine will be rendered capable of performing additional machining operations over and above the horizontal boring and/or milling operations conventionally accomplished by it, without interfering with such conventional operations, thereby considerably extending the range of usefulness of the machine.

It is an object of my invention to convert a machine of the type specified into a machine that will be capable of effecting both horizontal and vertical cutting—e.g. milling—operations in addition to the normal horizontal boring and milling operations accomplished by the machine.

Another object is to provide an improved attachment for a horizontal boring and/or milling machine.

A further object is to provide such an attachment in the form of an auxiliary machine head which may be readily mounted on an existing machine of the specified class.

Yet a further object is to provide an auxiliary head for a horizontal boring machine, enabling the machine to perform both vertical and horizontal cutting operations and turning operations in one or more directions.

A general object is to increase the versatility of horizontal boring machines without interfering with the efficiency thereof.

Broadly, I attain the above and further objects of my invention through the provision of an auxiliary head which may either be in the nature of an attachment removably mountable on an existent machine, or may be built-in during construction, which head is connected (or adapted for connection) with the conventional headstock of the horizontal boring machine in which the horizontal boring shaft or spindle is rotatably and axially slidably supported. The auxiliary head has means in it for rotatably supporting at least one auxiliary horizontal tool spindle provided in the form of a hollow sleeve which coaxially surrounds the first-mentioned conventional boring spindle of the machine, hereinafter termed the main horizontal spindle, which may be axially projected through and beyond the auxiliary sleeve so that a boring tool or the like mounted on the projecting end of the main spindle will not be interferred with by the cutting tool—such as a milling cutter—mounted on the hollow sleeve as the auxiliary horizontal spindle.

Furthermore, I provide means in the auxiliary head for rotatably supporting a vertical auxiliary tool spindle therein to the projecting end of which another cutting tool—e.g. milling cutter—can be secured. Any suitable means may be provided for driving these two auxiliary tool spindles at selected rates. Thus, each auxiliary spindle may be driven independently of the other auxiliary spindle and of the main spindle, or one or both of the auxiliary spindles may be driven off the same drive as the main spindle.

It will be apparent that my invention will make it possible to use a common horizontal boring and/or milling machine for performing a variety of horizontal and vertical milling, boring and other machining operations. Moreover this may be done without having to remove the workpiece from its support. In this way a wide variety of machining steps can be accomplished with high accuracy and with a reduction in time required for stoppage and adjustments. The above and further objects, features and advantages of the invention will be apparent from the ensuing description of one embodiment thereof and a modification. It will be understood that the description as well as the drawings to which it refers are merely exemplary and in no wise restrictive, since a large number of departures may be made from the structural forms illustrated and described without departing from the spirit of the invention.

In the accompanying drawings:

Figure 1 is a highly simplified, diagrammatic front view of an improved machine-tool attachment in accordance with a first embodiment of the invention;

Figure 2 is a corresponding side view;

Figure 3:
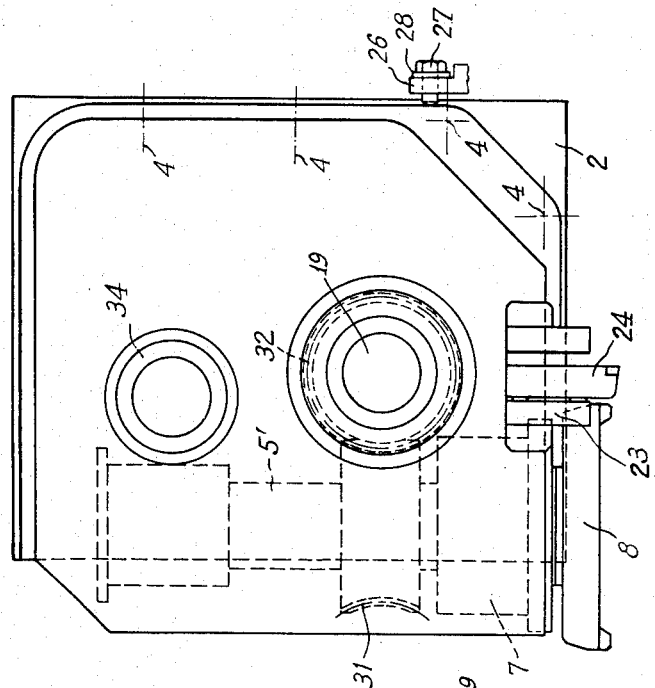
Figure 3 is a view similar to Figure 1 of a modified embodiment.

First referring to Figures 1 and 2, a horizontal boring and milling machine such, for example, as that shown in the applicant's Patent 2,674,925 issued April 13, 1954, which comprises a conventional headstock, partly shown at 3 in Fig. 2, which is movable horizontally on a carriage supported on the column of the machine to different positions in cantilever relation to the carriage, the headstock having an end flange 2. Secured to the planed front face of flange 2 by any suitable means such as bolts, not shown, but indicated in the figures by the center lines 4 thereof, is an auxiliary head comprising a casing or body 1 suitably formed with heavy stiffening ribs to impart a high degree of rigidity to the casing. Mounted in the casing 1 are an auxiliary vertical boring and milling spindle 5 and an auxiliary horizontal boring and milling spindle or sleeve 6. The vertical spindle 5 may be supported at one end in a pair of oppositely mounted taper roller bearings, not illustrated, within a bearing housing 7 formed in the casing, said bearings being adapted to take up and transfer to the casing the axial and radial stresses developed and applied to the spindle by the tool, such as a milling-cutter 8, mounted on the projecting end of the spindle 5. The upper end of vertical spindle 5 is supported and centered in a bearing housing 9 of the casing, by any appropriate means, such as a straight roller bearing. Secured on a projecting upper end portion of spindle 5 is a gear, e.g. worm gear 11, in meshing engagement with a drive worm 12 secured on a horizontal shaft 13. Drive shaft 13 has its ends journalled respectively in housings 14 and 15. While the journal means have not been illustrated, these may comprise a pair of opposed reversely mounted taper roller bearings in housing 14 and a single straight roller bearing in housing 15.

The drive shaft 13 is connected through a clutch coupling 16, of any suitable type, with a power takeoff shaft 17 mounted in headstock 3. Power take-off shaft 17 is preferably mounted in alignment with and so as to be coupled with the shaft of a motor imparting longitudinal traverse movement to the headstock so as to effect maximum drive efficiency and hence make maximum power available on vertical spindle 5.

Horizontal spindle or sleeve 6 is provided as a simple extension secured to the front face of the conventional sleeve or hollow spindle 18 of the headstock serving to rotate the main horizontal boring spindle 19 of the horizontal boring and milling machine. Horizontal spindle or sleeve 6 is a tubular shaft and its internal diameter is provided large enough to accommodate the main spindle 19 for free sliding displacement therein. Sleeve 6 is preferably provided towards its outer end with a suitable centering bearing in it for rotatably and slidingly supporting the main spindle 19, when projected from the headstock sleeve 18, so as to prevent said machine spindle from flexing under the loads developed during machining operations.

Desirably the drive ratios are so selected as to impart similar rotational velocities to both the vertical and horizontal auxiliary spindles 5 and 6 in order to facilitate selection of cutting speeds. In order to enable the machine spindle 19 to be used without having to remove the milling cutter tool 21 mounted on spindle or sleeve 6, the milling cutters used in connection with the horizontal spindle 6 should be made recessed.

It will be readily seen that with the arrangement described and illustrated, the vertical auxiliary spindle 5, its axis being offset with respect to the main spindle 19, may be used for performing any desired vertical boring and/or milling work without interfering with the machine's ability to perform conventional horizontal boring and/or milling operations, and without having to remove the work or dismantle any parts. The horizontal work may be performed either with the horizontal sleeve spindle 6 provided in accordance with this invention, or with the main horizontal spindle 19, which may be selectively pulled out any desired amount or pushed in through the recess in spindle 6.

In cases where the machine in which the invention is incorporated is provided with a vertical lathe plate for turning operations on a vertical axis, the head assembly 1 described hereinabove may desirably be provided with a rectified flat face 22 at its bottom end, adapted to carry thereon one or more tool carrier members, such as 23, supporting vertical lathe cutter tools 24, preferably provided for cutting in two mutually normal directions as illustrated. Preferably also, the flat face 22 may be formed with threaded holes and/or T-grooves therein whereby bar carriers, as schematically indicated at 25, may be mounted when desired to carry out internal turning operations in work having considerable depth dimensions, and similar operations.

Means are provided for facilitating the accurate positioning of the improved head upon the headstock of the machine. Such locating means may comprise a boss 26 projecting from the machine headstock 3 and formed with a threaded hole receiving a locating or positioning screw 27 therein, the tip of the screw being adapted for engagement with the casing 1, as shown in Figure 1. For determining the position of the head on the machine, a washer or shim 28 is interposed between the outer face of boss 26 and the under face of the head of screw 27, the thickness of said shim being accurately predetermined so that, with the screw turned in the threaded hole to bring the washer into tight engagement with the boss surface, and with the casing 1 moved into engagement with the tip of the screw, the said casing will be accurately true in the vertical direction. A plurality of similar locating devices may be provided round the periphery of casing 1, whereby the casing can be readily dismantled simply by loosening the screws a small amount, and can thereafter be reassembled in an accurately predetermined location by turning the screws to bring the heads against the related calibrated shims.

Figure 4:
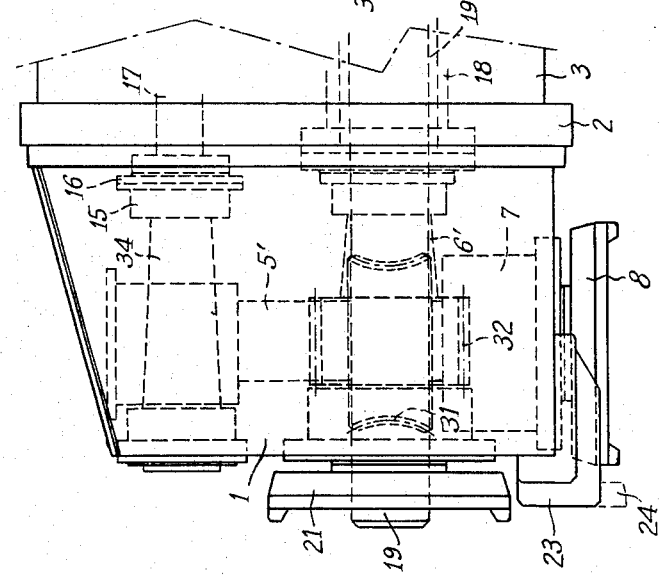
Figure 4 is a view similar to Figure 2 of the embodiment illustrated in Figure 3.

Referring next to Figures 3 and 4, a modified embodiment of the invention is there illustrated. This embodiment again includes an auxiliary horizontal milling and boring sleeve spindle 6' carrying cutter 21 and rotated by drive sleeve 18 connected for rotation with the slidable boring spindle of the machine as described in connection with the first embodiment.

There is also provided a vertical milling and boring spindle 5', but the drive therefor is somewhat different from the one previously described and comprises a gear drive which may include a worm gear 31 splined on the vertical spindle 5' and arranged for meshing engagement with a worm 32 splined on the horizontal spindle 6'.

This modified drive makes the power takeoff shaft 17 available for directly driving a further horizontal milling and boring shaft 34 which may be driven over a range of speed ratios different from that with which the spindle 6' is driven, e.g. at higher speed ratios, thereby increasing the range of utility of the machine. The horizontal spindle 34 is mounted in a manner similar to the mounting of horizontal spindle 6' and its drive may also be similar to that of this spindle.

It will be understood that the head constructed according to the embodiment shown in Figures 3 and 4 may be operated and used similarly to that shown in Figures 1 and 2, except that two additional milling and boring spindles 5' and 34 are here available instead of the single additional spindle 5 present in the first embodiment, in addition to the extension 6,6' of the sleeve of the boring spindle of the headstock of the machine.

Any and all of the vertical turning and boring tool carrier means mentioned in connection with the first embodiment may be used in connection with the embodiment last described.

Modifications may be made in the features of structure illustrated and described without departing from the spirit of the invention in accordance with any particular requirements of the use to which the improved machine is to be put.

What I claim is:

1. A tool head for mounting in a machine tool, said machine tool having a main spindle, a hollow spindle, a member supporting said main spindle within and coaxially with said hollow spindle and for rotation of said main spindle and said hollow spindle together on said axis extending generally horizontally and for movement of said main spindle parallel to and along said axis to different positions relative to said hollow spindle and to said member, and power transmission means supported by said member, said head comprising a body having a form providing for removably mounting said head on said member and extending from said member in the mounted position generally in the direction parallel to said main spindle axis, a sleeve supported by said body for rotation thereof on its axis coaxially with the axis of said main spindle in the mounted position of said head, said sleeve providing a hollow space about said axis thereof for movement of said main spindle through said hollow space in said movement of said main spindle parallel to said axis thereof relative to said hollow spindle and said member, said sleeve having a portion for carrying a tool rotatable therewith and disposed outwardly of said body along said axis of said sleeve, coupling means supported by said body and operatively connected to said sleeve and operatively connectible to said hollow spindle in the mounted position of said head for effecting rotation of said sleeve upon rotation of said hollow spindle, an auxiliary spindle supported by said body for rotation thereof on an axis extending transversely of said axis of said sleeve and offset transversely therefrom, said auxiliary spindle having a portion for carrying a tool rotatable therewith and disposed outwardly of said body along said axis of said auxiliary spindle, and a second coupling means supported by said body and operatively connected to said auxiliary spindle and operatively connectible to said power transmission means in the mounted position of said head for effecting rotation of said auxiliary spindle on said axis thereof upon operation of said power transmission means.

2. A tool head for mounting in a machine tool, said machine tool having a main spindle and a member supporting said spindle for rotation thereof on its axis extending generally horizontally and for movement of said spindle parallel to and along said axis to different positions relative to said member, and power transmission means supported by said member, and a power takeoff shaft supported by said member for rotation of said shaft on its axis, said head comprising a body having a form providing for removably mounting said head on said member and extending from said member generally in the direction parallel to said main spindle axis, a sleeve supported by said body for rotation thereof on its axis coaxially with the axis of said main spindle in the mounted position of said head, said sleeve providing a hollow space about said axis thereof for movement of said main spindle through said hollow space in said movement of said main spindle parallel to said axis thereof relative to said member, said sleeve having a portion for carrying a tool rotatable therewith and disposed outwardly of said body along said axis of said sleeve, means supported by said body and operatively connected to said sleeve and operatively connectible to said power transmission means in the mounted position of said head for effecting rotation of said sleeve, an auxiliary spindle supported by said body for rotation thereof on an axis extending transversely of said axis of said sleeve and offset transversely therefrom, said auxiliary spindle having a portion for carrying a tool rotatable therewith and disposed outwardly of said body along said axis of said auxiliary spindle, means supported by said body and operatively connected to said auxiliary spindle and operatively connectible to said power transmission means in the mounted position of said head for effecting rotation of said auxiliary spindle on said axis thereof, a connecting shaft supported by said body for rotation thereof on its axis and operatively connected to said auxiliary vertical axis spindle for effecting rotation of said auxiliary spindle upon rotation of said connecting shaft, and clutch means having an element operatively connectible to said power takeoff shaft and an element operatively connected to said connecting shaft for effecting rotation of said connecting shaft and said auxiliary spindle upon clutching operation of said clutch elements concomitantly with rotation of said power takeoff shaft and operable to disconnect said connecting shaft and said auxiliary spindle from said power takeoff shaft.

3. A tool head for mounting in a machine tool, said machine tool having a main spindle and a member supporting said spindle for rotation thereof on its axis extending generally horizontally and for movement of said spindle parallel to and along said axis to different positions relative to said member, and power transmission means supported by said member, said head comprising a body having a form providing for removably mounting said head on said member and extending from said member generally in the direction parallel to said main spindle axis, a sleeve supported by said body for rotation thereof on its axis coaxially with the axis of said main spindle in the mounted position of said head, said sleeve providing a hollow space about said axis thereof for movement of said main spindle through said hollow space in said movement of said main spindle parallel to said axis thereof relative to said member, said sleeve having a portion for carrying a tool rotatable therewith and disposed outwardly of said body along said axis of said sleeve, means supported by said body and operatively connected to said sleeve and operatively connectible to said power transmission means in the mounted position of said head for effecting rotation of said sleeve, an auxiliary spindle supported by said body for rotation thereof on an axis extending transversely of said axis of said sleeve and offset transversely therefrom, said auxiliary spindle having a portion for carrying a tool rotatable therewith and disposed outwardly of said body along said axis of said auxiliary spindle, means supported by said body and operatively connected to said auxiliary spindle and operatively connectible to said power transmission means in the mounted position of said head for effecting rotation of said auxiliary spindle on said axis thereof, a second auxiliary spindle supported by said body for rotation thereof on a horizontal axis parallel to and spaced from said sleeve axis, said second auxiliary spindle axis being offset generally horizontally from the vertical axis of said first auxiliary spindle, and means supported by said body and operatively connected to said second auxiliary spindle and operatively connectible to said power transmission means for effecting rotation of said second auxiliary spindle, said second auxiliary spindle having a portion thereof for carrying a tool disposed along its axis outwardly of said body for rotation of said tool with said second auxiliary spindle.

4. A tool head for mounting in a machine tool, said machine tool having a main spindle and a member supporting said spindle for rotation thereof on its axis extending generally horizontally and for movement of said spindle parallel to and along said axis to different positions relative to said member, and a hollow spindle supported by said member for rotation thereof on the axis of said main spindle, and power transmission means supported by said member, said head comprising a body having a form providing for removably mounting said head on said member and extending from said member generally in the direction parallel to said main spindle axis, a sleeve supported by said body for rotation thereof on its axis coaxially with the axis of said main spindle in the mounted position of said head, said sleeve providing a hollow space about said axis thereof for movement of said main spindle through said hollow space in said movement of said main spindle parallel to said axis thereof relative to said member, said sleeve having a portion for carrying a tool rotatable therewith and disposed outwardly of said body along said axis of said sleeve, means supported by said body and operatively connected to said sleeve and operatively connectible to said power transmission means in the mounted position of said head for effecting rotation of said sleeve, an auxiliary spindle supported by said body for rotation thereof on an axis extending transversely of said axis of said sleeve and offset transversely therefrom, said auxiliary spindle having a portion for carrying a tool rotatable therewith and disposed outwardly of said body along said axis of said auxiliary spindle, means supported by said body and operatively connected to said auxiliary spindle and operatively connectible to said power transmission means in the mounted position of said head for effecting rotation of said auxiliary spindle on said axis thereof, means operatively connectible to said hollow spindle and operatively connected to said sleeve of said head for rotation of said sleeve upon rotation of said hollow spindle, a driving gear carried by said sleeve of said head and rotatable therewith, and a gear driven by said driving gear and carried by said auxiliary vertical axis spindle for effecting rotation of said auxiliary spindle on said vertical axis upon rotation of said sleeve.

5. A tool head for mounting in a machine tool, said machine tool having a main spindle and a member supporting said spindle for rotation thereof on its axis extending generally horizontally and for movement of said spindle parallel to and along said axis to different positions relative to said member, and power transmission means supported by said member, and a power takeoff shaft supported by said member for rotation of said shaft on its axis, said head comprising a body having a form providing for removably mounting said head on said member and extending from said member generally in the direction parallel to said main spindle axis, a sleeve supported by said body for rotation thereof on its axis coaxially with the axis of said main spindle in the mounted position of said head, said sleeve providing a hollow space about said axis thereof for movement of said main spindle through said hollow space in said movement of said main spindle parallel to said axis thereof relative to said member, said sleeve having a portion for carrying a tool rotatable therewith and disposed outwardly of said body along said axis of said sleeve, means supported by said body and operatively connected to said sleeve and operatively connectible to said power transmission means in the mounted position of said head for effecting rotation of said sleeve, an auxiliary spindle supported by said body for rotation thereof on an axis extending transversely of said axis of said sleeve and offset transversely therefrom, said auxiliary spindle having a portion for carrying a tool rotatable therewith and disposed outwardly of said body along said axis of said auxiliary spindle, means supported by said body and operatively connected to said auxiliary spindle and operatively connectible to said power transmission means in the mounted position of said head for effecting rotation of said auxiliary spindle on said axis thereof, a connecting shaft supported by said body for rotation thereof on its axis in alignment with said power takeoff shaft in the mounted position of said head on said member, coupling means carried by said head and having an element operatively connectible to said power takeoff shaft in said mounted position of said head and having an element operatively connected to said connecting shaft for effecting rotation of said connecting shaft upon coupling engagement of said elements concomitantly with rotation of said power takeoff shaft, said elements being disengageable to disconnect said connecting shaft from said power takeoff shaft, and a gear drive operatively connected between said connecting shaft and said auxiliary spindle for driving said spindle upon rotation of said connecting shaft.

6. A tool head for mounting in a machine tool, said machine tool having a main spindle and a member supporting said spindle for rotation thereof on its axis extending generally horizontally and for movement of said spindle parallel to and along said axis to different positions relative to said member, and power transmission means supported by said member, said head comprising a body having a form providing for removably mounting said head on said member and extending from said member generally in the direction parallel to said main spindle axis, a sleeve supported by said body for rotation thereof on its axis coaxially with the axis of said main spindle in the mounted position of said head, said sleeve providing a hollow space about said axis thereof for movement of said main spindle through said hollow space in said movement of said main spindle parallel to said axis thereof relative to said member, said sleeve having a portion for carrying a tool rotatable therewith and disposed outwardly of said body along said axis of said sleeve, means supported by said body and operatively connected to said sleeve and operatively connectible to said power transmission means in the mounted position of said head for effecting rotation of said sleeve, an auxiliary spindle supported by said body for rotation thereof on an axis extending transversely of said axis of said sleeve and offset transversely therefrom, said auxiliary spindle having a portion for carrying a tool rotatable therewith and disposed outwardly of said body along said axis of said auxiliary spindle, and means supported by said body and operatively connected to said auxiliary spindle and operatively connectible to said power transmission means in the mounted position of said head for effecting rotation of said auxiliary spindle on said axis thereof, said last mentioned means comprising a gear drive operatively connected between said sleeve and said auxiliary spindle for driving said auxiliary spindle from said sleeve.

References Cited in the file of this patent

UNITED STATES PATENTS

| 963,904 | Lang | July 12, 1910 |
| 1,188,339 | Sinderson | June 20, 1916 |
| 1,723,999 | Bernard | Aug. 13, 1929 |
| 2,027,385 | Kraut et al. | Jan. 14, 1936 |
| 2,227,410 | Johnson | Dec. 31, 1940 |
| 2,432,633 | Sirp | Dec. 15, 1947 |
| 2,549,490 | Kuhl | Apr. 17, 1951 |
| 2,622,454 | Boehm | Dec. 23, 1952 |

FOREIGN PATENTS

| 501,622 | Italy | Nov. 25, 1944 |